United States Patent [19]

Hitzelberger

[11] 4,245,464
[45] Jan. 20, 1981

[54] QUICK RELEASE TURBINE GATE VALVE

[75] Inventor: Alan L. Hitzelberger, Grand Blanc, Mich.

[73] Assignee: General Motors Corporation, Detroit, Mich.

[21] Appl. No.: 50,150

[22] Filed: Jun. 20, 1979

[51] Int. Cl.³ .............................................. F02C 9/02
[52] U.S. Cl. ................... 60/39.25; 415/38; 415/44
[58] Field of Search ................... 60/39.25; 415/36, 38, 415/40–45, 48

[56] References Cited

U.S. PATENT DOCUMENTS

| | | | |
|---|---|---|---|
| 2,565,178 | 8/1951 | Imbert | 60/39.25 |
| 3,025,668 | 3/1962 | Mock | 60/39.25 |
| 3,383,090 | 5/1968 | McLean | 415/43 |
| 3,388,778 | 6/1968 | McLean | 60/39.25 |
| 3,814,537 | 6/1974 | Stoltman | 60/39.25 |
| 3,913,316 | 10/1975 | Canale et al. | 60/39.25 |

Primary Examiner—Robert E. Garrett
Attorney, Agent, or Firm—J. C. Evans

[57] ABSTRACT

A gas turbine engine has a compressor and power turbine driven by gas flow across a nozzle arrangement that includes a partial admission gate valve therein movable into and out of overlying relationship with a limited number of vanes of the nozzle in order to control power output therefrom during part load operation of the engine. The gates are operated by quick response pneumatic operators having a regulated source of pressure applied to the operators to close the gates during a low power, road load mode of engine operation; an orifice restricts flow into a pressurizable chamber formed in part by a movable power diaphragm to cause a controlled buildup of pressure therein and a slow velocity extension of the operator to position the gates in part power position and wherein means are included to produce a slow rate retraction to avoid excess turbine temperatures and wherein dump means disconnect the regulated pressure from the operator whereby the diaphragm is snapped by a return spring to produce a quick spring biased opening of the gate valve from its partial blocking position to a full open position during a time period that prevents turbine compressor surge as the gas turbine engine responds to a higher power demand wherein greater gas flows through the nozzle for increasing power output from the power turbine of the engine.

5 Claims, 3 Drawing Figures

QUICK RELEASE TURBINE GATE VALVE

This invention relates to gas turbine engine control systems and more particularly to gas turbine engine control systems utilizing gates for regulating gas flow through a power turbine nozzle to regulate the power turbine output from a gas turbine engine.

Various proposals have been suggested for controlling the amount of motive fluid directed across the nozzle of a power turbine of a gas turbine engine. One such arrangement is shown in U.S. Pat. No. 3,025,668 issued Mar. 20, 1962, to Mock. The system includes an adjustable damper plate that is arranged in overlying relationship to a diaphragm guide member and rotated with respect to spaced, arcuate sets of turbine nozzle vanes therein for controlling the amount of motive fluid directed into the turbine wheel for controlling the amount of power output therefrom.

U.S. Pat. No. 2,565,178 issued Aug. 21, 1951, to Imbert, discloses another suggestion for blocking part of the gas flow through the turbine nozzle of a gas turbine engine. In this arrangement, a cylinder is moved selectively into and out of the flow passages between the vanes of the turbine expansion nozzle leading to the turbine wheel of the gas turbine engine. The movable flow regulating components of the aforesaid patents are connected to linkages which require a substantial time period for actuation.

In present day automotive gas turbine type engines, lightweight gate valve components of low inertia are incorporated in association with specially formed turbine nozzle arrangements to effect a controlled, regulation of gas flow through the power turbine to tailor the output power from the engine in a manner to improve specific fuel consumption under part load conditions of operation. Such control devices are set forth in co-pending U.S. Ser. No. 50,411 to Albert H. Bell III, filed June 20, 1979, with a common assignee to the present invention. In such arrangements, it is desirable to utilize a pneumatic operator for positioning the gate valves; the operator including modes of operation to control the gate movement for a slow insertion and retraction of the gate between closed and open positions thereof and a quick retraction of the gate from its blocking position under a condition of engine operation which might otherwise cause engine surge.

Further, under normal road load conditions of gas turbine engine operation, the power capacity of the engine exceeds that required for operating road vehicles. Accordingly, various proposals have been suggested to reduce the fuel requirements for a gas turbine engine under part load conditions. One approach has been to utilize a split compressor of the type set forth in U.S. Pat. No. 3,625,003, issued Dec. 7, 1971, to Liddle. In this arrangement, under part load conditions, only a part of the gas capacity is utilized thereby to better match the engine characteristics to load requirements under part load conditions. Another approach to improved part load operation is set forth in co-pending United States application, Ser. No. 792,814, filed Oct. 15, 1976, to Liddle et al for a variable flow capacity gas turbine engine for improved part load fuel economy. In this arrangement a proposal is made to selectively control the amount of gas flow through a gas turbine engine in accordance with its power and road load requirements, thereby to improve specific fuel consumption characteristics of the engine.

In high performance, light weight gas turbine engines, it is desirable to have quick response control characteristics and as a result a part load controller with quickly operable components is proposed in the aforesaid co-pending application, Ser. No. 50,411 filed June 20, 1979, of Albert H. Bell III for use with a 360° nozzle ring of a power turbine of an automotive gas turbine engine wherein the gates are selectively positioned at upstream edges of a limited number of the nozzle vanes and selectively moved in a plane arranged perpendicularly to that of the axis of rotation of the power turbine from a stored position out of the hot gas flow path through the turbine and in a way to prevent excessive gas leakage from the gas flow path and movable into the gas flow path to assume a blocking position with respect to the leading edge where a portion of the gate valve is pressure biased against flat portions of the leading edge of a limited number of the nozzle vanes to block flow therethrough them in a controlled fashion to increase the turbine inlet temperature for improved thermodynamic operation of the engine.

Accordingly, an object of the present invention is to provide an improved pneumatic control system for regulating controlled response movement of gate valves between blocking and open positions in a turbine nozzle arrangement; the control system including means to produce a controlled rate insertion and retraction of the gate valves between blocking and open positions with respect to the nozzle vanes between idle speed and road speed conditions of operation of a gasifier of the engine thereby to prevent sudden changes in the output power of the engine and wherein the control system has an improved pneumatic operator selectably connected to atmosphere to condition the controller for a quick dump retraction of the gates from their blocking position to a storage position wherein the gas flow path through the turbine nozzle is completely opened to accommodate increased mass flow of combustion products to the turbine nozzle in response to operation of an acceleration command thereby to prevent engine surge during such acceleration modes of operation.

Still another object of the present invention is to improve pneumatic control systems for use with dual gate valve components of low inertia for closely regulating flow through a limited number of passages in a full 360° ring of nozzle vanes upstream of a power turbine of an automotive type gas turbine engine wherein the system includes a pneumatic operator connected to a regulated source of pressure through a solenoid valve responsive to control signals including but not limited to the turbine speed and wherein an inlet control to the pneumatic operator has a supply orifice selected to direct the regulated pressure into a pressurizable chamber formed in part by a power diaphragm responsive to a slow rate of pressure build-up as established by the supply orifice to slowly extend the operators to produce a first slow rate blockage of the passages through the nozzle to produce an increase in the turbine inlet temperature thereby to produce a greater thermal efficiency of engine operation under road load conditions of engine operation; and wherein the pressurizable chamber is selectively communicated with a second orifice controlled bleed path to atmosphere under conditions of operation to prevent excessive increases in regenerator temperature during operation of the engine under road load conditions so that bleed through the second orifice is at a slow controlled rate to cause a selective slow rate retraction of the control gates from blocking positions in the nozzle thereby to produce a gradual power change regulated by the restricted air flow; the improved control system including dump means being responsive to a dump control signal for producing a rapid depressurization of the pressurizable power chamber to cause a quick shift of the power diaphragm for an immediate removal of the gate valves from the nozzle thereby to prevent engine surge during a demand acceleration phase of engine operation.

Yet another object of the present invention is to improve pneumatic control systems for turbine engine gate valves as set forth in the preceding object wherein the dump control means includes a solenoid controlled flapper selectively positioned against a valve seat on the end of a low volume dump tube attached directly to the housing of the pneumatic operator.

Further objects and advantages of the present invention will be apparent from the following description, reference being had to the accompanying drawings wherein a preferred embodiment of the present invention is clearly shown.

Figure 1:
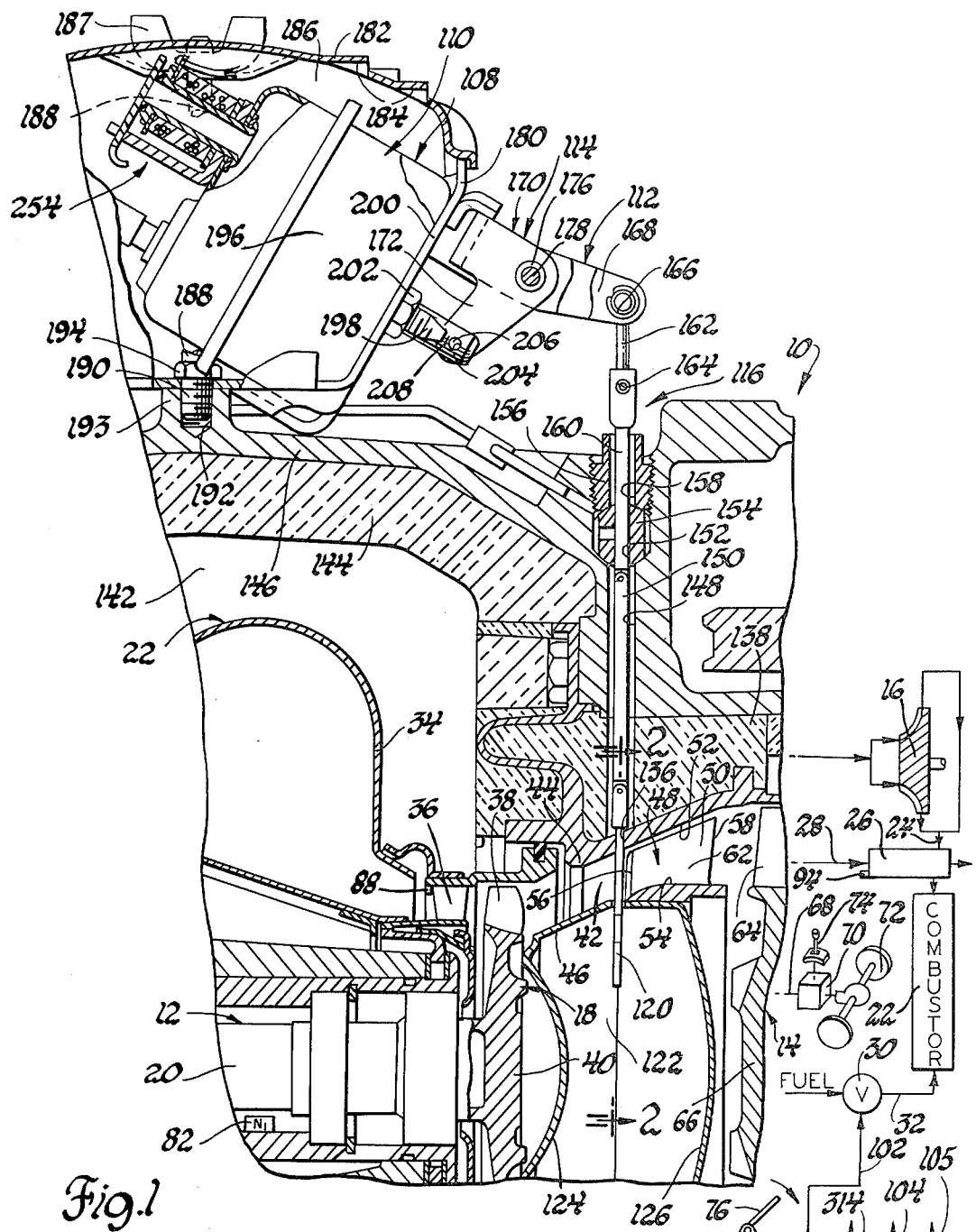
FIG. 1 is a fragmentary longitudinal view of a gas turbine gas flow path associated with a diagrammatic engine system and a quick response pneumatic operator system of the present invention.
Figure 2:
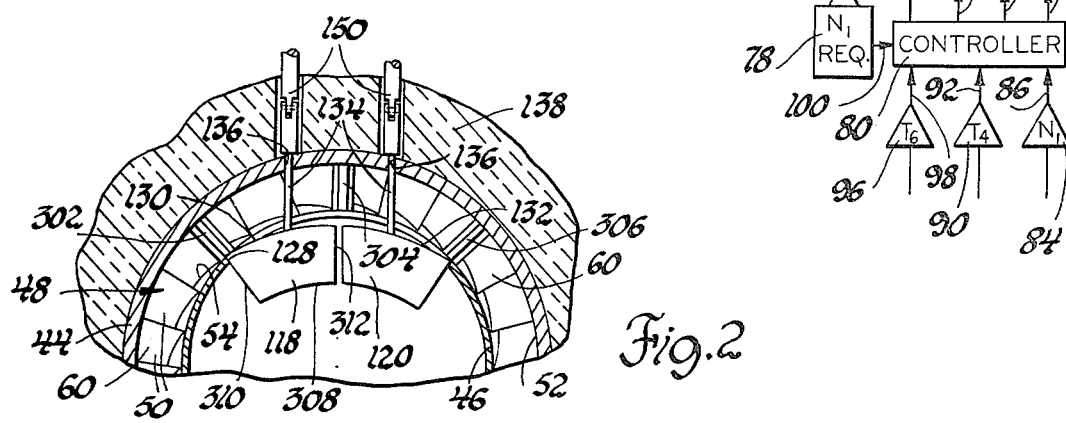
FIG. 2 is a fragmentary vertical sectional view taken along the line 2—2 of FIG. 1 looking in the direction of the arrows.

Referring now to the drawings, in FIG. 1, an automotive gas turbine engine 10 is illustrated having a gas coupled gasifier spool 12 and power turbine spool 14. The gasifier spool 12 includes a compressor 16 that is connected to a high pressure gasifier turbine wheel 18 by a drive shaft 20 so that the compressor 16 is driven to take in atmospheric air, compress it and supply it to a combustor 22 through an inlet air pass 24 of a heat exchanger 26 that further includes an exhaust heat pass 28 therethrough for extracting heat from engine exhaust for preheating of the compressed inlet air directed through the air pass 24 of heat exchanger 26. Fuel is supplied to the combustor 22 from a suitable source such as an engine driven pump (not illustrated) through a fuel controlling or fuel metering valve 30 and an engine fuel supply line 32. Combustion products resulting from burning of the fuel and the air within the combustor 22 are directed through an outlet transition 34 from the combustor 22 thence through an annular row of nozzle vanes 36 against turbine blades 38 on a rotor rim 40 of the high pressure turbine wheel 18 to extract energy for rotation of the compressor 16. The motive fluid from the outlet transition 34 of the combustor 22 is further directed through a gas flow path 42 formed by an annular internal shroud 44 of the engine and an internally located wall 46. The flow path 42 communicates with a power turbine nozzle 48 having an annular row of turbine vanes 50 therein between the inner surface 52 of the shroud 44 and an inner annular band 54 of the power turbine nozzle 48 as best seen in FIG. 2. The turbine vanes 50 each include a leading edge 56 and a trailing edge 58 as well as a suction surface 60 and a pressure surface 62 for directing motive fluid against turbine blades 64 on a rotor wheel 66 of the power turbine spool 14 to extract power from motive fluid directed thereagainst from the power turbine nozzle 48 and thereby to transfer power to an output shaft 68 connected to a suitable transmission 70 and road drive wheels 72. Details of the transmission and drive wheels are omitted herewith for purposes of clarification; however, such details are well known devices used in conjunction with automotive type gas turbine engines. For example, the transmission 70 typically includes some form of clutch or other device which allows the output shaft 68 to rotate when the drive wheels 72 are stationary. Examples of such arrangements are releasable clutch, slipping clutch, a fluid flywheel or most likely a torque converter since such converters produce best operating characteristics in such vehicles. The transmission 70 may also, as is usual, include forward drive gears of several ratios and a reverse drive gear. Such transmissions also include a neutral position in which no power is transmitted to the road drive wheels 72 and furthermore preferably include a park position in which the propeller shaft of the drive is locked. Such transmissions typically include an operating lever 74 movable to select park, reverse, neutral and other forward drive conditions of the transmission.

In the illustrated arrangement, the power level of the engine is controlled by the vehicle operator by a suitable power request input 76 which is usually a foot throttle or actuator pedal of the vehicle. Ordinarily, in gas turbine controls, such an input 76 sets the speed or temperature level of the engine subject to limiting overrides of the power level as preset by the input 76. In the illustrated arrangement, the power request pedal 76 actuates an $N_1$ request transmitter 78 which transmits a signal of desired gas generator speed to a gas turbine engine controller 80. Furthermore, the controller 80 is associated with transducers or transmitters which provide signals indicative of various conditions of engine operation. Only those signals which are necessary for understanding the operation of the improved quick response pneumatic operator of the present invention will be disclosed herein. They include a gas generator turbine speed signal produced by an $N_1$ transducer 82 which may be a suitable electronic or other tachometer having an amplifier 84 to deliver a potential proportional to gas generator speed to a line 86 serving as an input of this signal to the controller 80. Gas generator turbine inlet temperature identified as $T_4$ is measured by a thermocouple or other suitable temperature sensitive means 88 located in the flow path from the combustion apparatus 22 into the high pressure turbine 18. Such temperature measuring devices ordinarily include an amplifier 90 that can include compensation for thermocouple temperature lag to establish an instantaneously corrected turbine inlet temperature directed through the line 92 as an indication of turbine inlet temperature to the controller 80. A third input to the controller 80 is the temperature of the inlet portion of the exhaust path 28 as sensed by a temperature sensing device such as a thermocouple 94 that produces a temperature signal that is compensated for by thermocouple lag in a $T_6$ amplifier 96 connected by an input line 98 to the controller 80 for overriding the power request signal transmitted by the request transmitter 78 through line 100 to the controller 80.

The signal of line 100 is compared to the actual signal from the $N_1$ speed amplifier 84 to produce an error signal that is processed by controller 80 to produce an output signal therefrom through line 102 for controlling the amount of fuel flow through the fuel metering valve 30 to the combustor 22. Additionally, the controller 80 produces signals through lines 104, 105 that are directed to three-way control valve assemblies 106, 107 to actuate them into selective mode positions for establishing the controlling action of quick response pneumatic operators 108, 110, all shown diagrammatically in FIG. 3. The pneumatic operators 108, 110 are coupled through linkages 112, 114 of a drive system 116 to operate a pair of flow control gate valves 118, 120 for regulating the gas flow through the power turbine nozzle 48 as will be discussed.

Referring now more particularly to the flow control gate valves 118, 120, as best shown in FIG. 2, they are located within a storage space 122 within the engine when in a retracted position. More particularly, the storage space 122 is defined by the inner wall 46 and axially spaced metal diaphragms 124, 126. The wall 46 includes an elongated slot 128 therein aligned with upwardly facing curved surfaces 130, 132 formed on the gate valves 118, 120, respectively, to fill the slot 128 when the gates are in a retracted position thereby to prevent any excessive flow of motive fluid from the flow path 42 to maintain efficiency during maximum flow control positions as shown in solid line in FIG. 2. Each of the gates 118, 120 has an upstanding stem 134 connected thereto of round cross section. Each stem 134 extends through a circular hole 136 in the shroud 44 and thence through a layer 138 of thermal insulation surrounding the shroud 44. In the illustrated arrangement the surface of the shroud 44 is covered by a second thermal insulation layer 140 inboard thereof in facing relationship to the combustor 22 which is located within an air supply plenum 142 formed in part by an upper layer of thermal insulation 144 covering an engine block wall 146. The engine block wall 146 has a bore 148 therein that receives an operator rod 150 extending through a hole 152 in a seal gland 154 at the upper end of bore 148. Gland 154 is held in place by a plug 156 threadably secured in wall 146. A bore 158 in plug 156 receives the upper end portion 160 of the operator rod 150 which extends outside the wall 146 as best shown FIG. 1. The upper end 160 of each of the rods 150 is connected by a U-shaped link 162 having one end thereof directed through a pivot hole 164 in the end 160.

Each link 162 has the opposite end thereof directed through a pivot hole 166 in a side segment 168 of a U-shaped lever arm 170 with an opposite side segment 172 thereon. Each of the side segments 168, 172 has a bushing 174, 176 directed therethrough, respectively, with the bushings 174, 176 being freely slidably supported on the outer surface of a cross shaft 178 of the drive system 116 as is best shown in FIG. 1. This arrangement enables the pneumatic operators 108, 110 to be located in close side-by-side relationship within a sheet metal housing 180 having a removable sheet metal cover 182 with louvers 184 struck in one end thereof to cool the interior 186 formed between the cover 182 and the housing 180. The housing and cover are held in place by a wing nut 187 and upright threaded stud 188 having a lower threaded end 190 threadably received in a tapped bore 192 in a boss 193 on engine block wall 146 as best shown in FIG. 1. Lock nut 194 fixes end 190 in place.

Each of the quick response pneumatic operators 108, 110 includes a cylindrical support base 196 with connector studs 198 thereon that extend through openings in the housing 180 at a wall segment 200 thereof where they are fastened in place by nuts 202.

Figure 3:
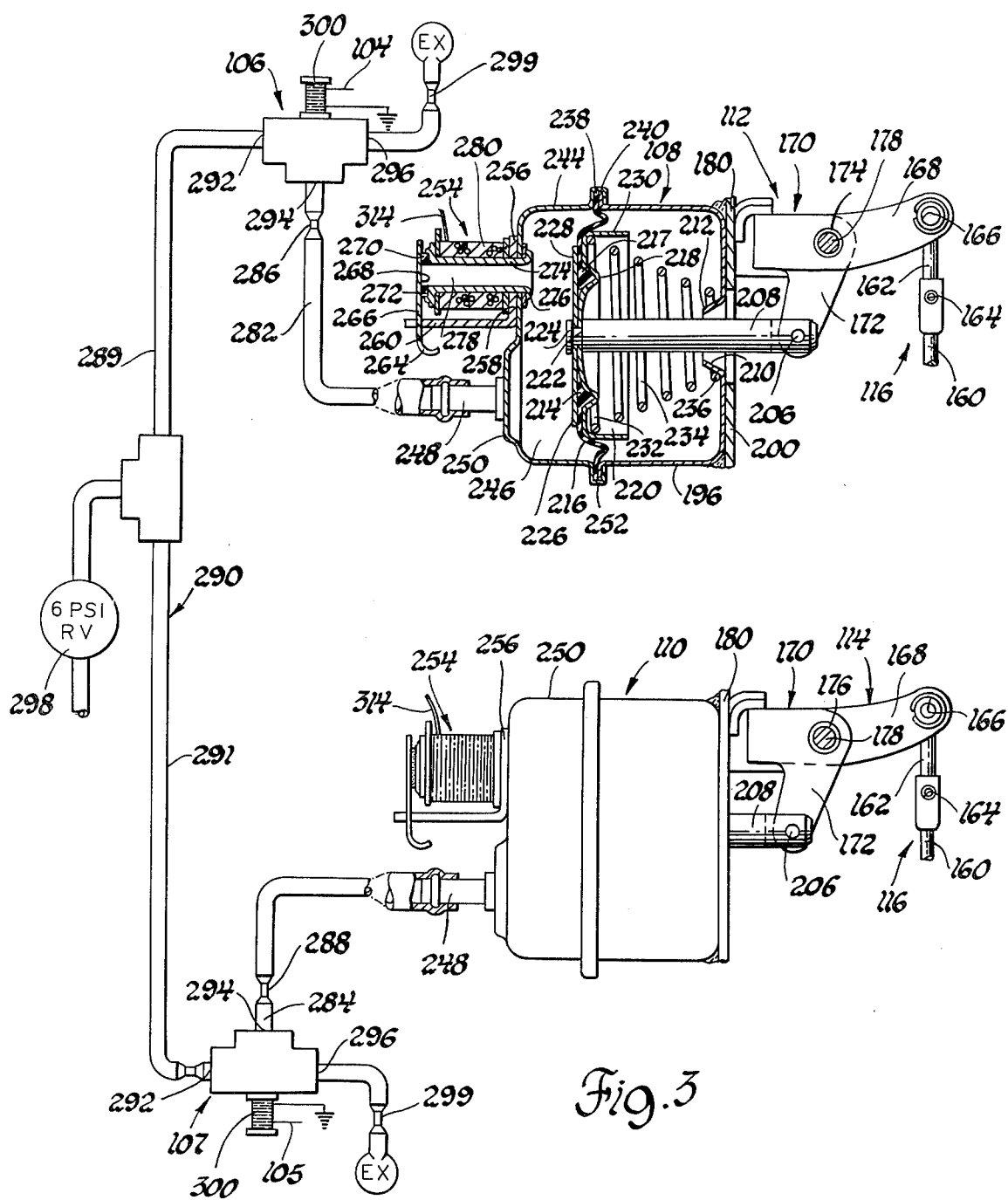
FIG. 3 is a diagrammatic view of the pneumatic control system of the present invention.

As best shown in FIG. 1, each of the lever side segments 172 is in the form of a crank arm with a pivot point 204 thereon secured by a pin 206 to the outboard end of a reciprocal shaft 208 of each of the operators 108, 110. Each shaft 208 extends through an opening 210 formed by an inwardly directed tubular extension 212 on the base segment 196 as best seen in FIG. 3. The opposite end of each shaft 208 is sealingly secured to an annular lip 214 on a flexible power diaphragm 216. More particularly, the annular lip 214 is contoured at 217 to conform to an annular corrugation 218 formed in a spring retainer 220 having a wall surface thereon seated on a shoulder 222 of the operator shaft 208. It is held in sealing engagement with the shoulder 222 by a struckover head 224 thereon in engagement with the outer surface of a diaphragm retainer plate 226 having its outer periphery in sealed engagement with the inboard surface 228 of the diaphragm 216 at the point where it extends outwardly of the plate 226 and an annular flange 230 on the spring retainer 220. The spring retainer 220 captures a large diameter end 232 of a coil spring 234 having the opposite end 236 thereof seated around the inboard surface of the tubular extension 212. The outer peripheral edge 238 of the power diaphragm 216 is held between an outer peripheral lip 240 on the cylindrical support base 196 and a reversely turned edge on a cylindrical closure 244 that, along with the flexible power diaphragm 216, defines a pressurizable power chamber 246.

Entrance to each of the controllers 108, 110 is through an inlet tube 248 connected to the end of a closure member 250 that has a bent periphery 252 thereon that clamps the diaphragm 216 to the outwardly directed end flange of the base 196. Additionally, each operator 108, 110 includes a pressure dump mechanism 254 thereon. Each of the pressure dump mechanisms 254 more particularly includes a bent armature plate 256 having a base segment 258 thereon connected to the end of the closure member 250. It includes an outward extension 260 thereon that receives a bent end 264 on a movable flapper 266 of magnetizable material that includes a valve surface 268 thereon selectively positioned with respect to an O-ring valve seat 270 that is supportingly received in an undercut annular surface 272 formed in the end of a dump tube 274 having an inboard end 276 bent over into engagement with the inner surface of the closure member 250 to define a low volume exhaust passage 278 from the pressurizable chamber 246 of each of the pneumatic operators 108, 110. A solenoid coil 280 surrounds the dump tube 274 and is selectively energizable to either magnetically attract the movable flapper 266 into sealed engagement with the O-ring valve seat during normal controller operation. During a dump phase of operation, the solenoid 280 is deenergized thereby to cause the flapper 266 to be pressure biased out of sealed engagement with the O-ring valve seat 270. Because of the low volume of the passage 278, the pressurized fluid in the pressurizable power chamber 246 is quickly directed to atmosphere by the bias of the coil spring 234 which produces a snap movement of the diaphragm 216 toward the closure member 250, thereby to quickly move the gate valves 118, 120 into their retracted solid line position as shown in FIG. 2.

Each of the conduits 282, 284 has an orifice 286, 288 therein for establishing a control rate of pressure buildup within the pneumatic operators 108, 110. The conduits 282, 284 and orifices 286, 288 are connected by the valves 106, 107 to branch lines 289 and 291 of a fluid supply system 290 for association with the pneumatic operators 108, 110 and operative to produce a controlled slow rate movement of the gate valves 118, 120 as will be discussed.

Each of the three-way control valves 106 has a plurality of fittings 292, 294 and 296 thereto. The fitting 292 is in communication with a regulated source of active control pressure 298 constituting the inlet to the supply system 290. Each fitting 296 is in communication with atmosphere across a control orifice 299. The fitting 294 is connected to conduit 282 or 284 to either pneumatic operator 108 or pneumatic operator 110. Each control valve 106, 107 includes a solenoid coil 300 that is selectively energized in response to signals from the output line 104 or output line 105 from the controller 80 to produce selective operation of either of the quick response pneumatic operators 108, 110.

Operation of the controllers 108, 110 in a typical engine operating sequence includes conditioning them to place gate valves 118, 120 as shown in FIG. 2 as the spool 12 increases in speed from an idle speed to 50%–60% of design speed whereby the power turbine nozzle 48 is fully opened through a 360° row of nozzle vanes 50. However, as the gasifier spool speed increases it has been observed that more thermally efficient operation can be obtained by selectively pulling one or both of the gates 118, 120 upwardly into overlying relationship with flat surfaces 302, and 306 on the leading edges of the nozzle vanes as shown in FIG. 2. More particularly, as the gasifier spool speed increases, a signal from line 104 will condition the valve 106 to direct pressure from the source 298 into the pneumatic operator 108 to cause an increase in pressure within the chamber 246 at a rate determined by orifice 286 which will cause a controlled rightward movement of the diaphragm 216 as shown in FIG. 3. This will cause the pivot point 204 to move in an arcuate path around the axis of the support shaft 178 and will thereby shift the control rod 150 that is connected to the gate 118 in an upward direction. The rate of closure is reduced because of the control action of the orifice 286 so that the curved surface 130 will move across the gas flow passages between the flattened portions 302, 304 on the leading edges of the vanes 50 of turbine nozzle 48 to gradually reduce the total flow area through the turbine nozzle by an amount equal to the planar extent of the gate 118 between its base 308, the curved surface 130 thereon and sides 310, 312 thereof that join the curved surface 138 with the base 308. Eventually, the gate 118 is moved to a closed position where the curved edge 130 engages the inner surface 52 of shroud 44. At this point the side 310 is pressed by motive fluid in flow path 42 into engagement with the flat surface 302 and the side 312 is seated in sealed engagement with the flat surface 304. The reduction in total flow area through the nozzle 48 produced by movement of gate 118 is gradual and there will be a gradual power change that is accompanied by an increase in the inlet temperature of the turbine 18. This causes an increase in thermal efficiency and reduces specific fuel consumption of the engine. As engine speed continues to increase a second signal is directed through the line 105 to the three-way valve 107 to cause it to direct pressure from the regulated pressure source 298 to the inlet tube 288 of the pneumatic operator 110. Its power diaphragm 216 will be pressurized at a rate established by flow through orifice 288 to shift reciprocal shaft 208 outwardly in a direction to cause the rod 150 of gate valve 120 to move outwardly of the engine block wall 146 so that the curved surface 132 of gate valve 120 will move slowly to block the flow area between the flat surfaces 304, 306 on the turbine nozzle 48 until side edges 316, 318 on either side of gate valve 120 are located in sealing engagement with the full vertical extent of the flat surfaces 304, 306. This completely blocks a second limited arcuate extent of the total flow area through the 360° row of turbine vanes 50. The remainder of the inlet passages between the vanes of the turbine nozzle 48 are unaffected by the control movement and a near complete annulus of gas flow (other than through the portion blocked by gates 118, 120) freely flows from the flow path 42 through the nozzle 48 thereby to prevent any substantial change in the aerodynamic flow pattern of the flow path through the engine.

The additional blockage of the nozzle 48 by gate valve 120 will further increase the inlet temperature of high pressure turbine 18 to produce greater thermal efficiency thereby to reduce the specific fuel consumption of the engine.

In such turbine engine operation it is observed that as the $T_4$ temperature increases, the temperature into the regenerator, $T_6$, as sensed by the thermocouple 94, may exceed desired limits. If this condition occurs, the signal in line 105 is modified to condition the control valve 107 to communicate the pressurized chamber 246 of pneumatic controller 110 with atmosphere across the orifice 299. The orifice 299 is sized so that pressure will be bled from chamber 246 to cause a slow retraction of the operating shaft 208 to the left as shown in FIG. 3. This will cause the gate valve 120 to be pushed downwardly by the control rod 150 connected thereto to gradually increase the amount of gas flow through the power nozzle 48 to produce a gradual power change which will cause the turbine inlet temperature to be reduced. As the turbine engine inlet temperature goes down, the $T_6$ temperature will follow to maintain modulated control of the $T_6$ temperature produced in response to a slow movement of the gate valve 120 into its stored position within the storage space 122. If further thermal regulation is required, a like conditioning of the three-way valve 106 can occur to produce a like operation of the pneumatic controller 108 and gate valve 118.

Thus, between idle and normal road speeds, (50%–60% of $N_1$ engine design speed), both the gate valves 118, 120 are located in the storage position. When the spool 12 reaches approximately 60% of its full design speed, the speed of operation is that reached under normal road load conditions. Accordingly, the gates are operated to slowly increase power by movement into their blocking positions as previously discussed, preferably in a staged fashion, and this will increase the input temperature to the turbine and will result in a more efficient thermal operation with a reduced requirement for fuel. The gates 118, 120 are moved from their blocking position under such road load conditions only in cases where the increases in the temperature of the turbine increase to the point where the downstream temperature $T_6$ into the heat exchanger 26 exceeds an upper limit. At this point the control gates are adjusted between open and closed positions with respect to only a limited arcuate extent of the 360° nozzle 48, again at a slow rate, because of the configuration of the improved pneumatic operators 108, 110 of the present invention and the associated fluid supply system 290.

Another feature of the present invention is that the quick response pneumatic operators 108, 110 can be quickly conditioned through means of a single fluid connection to produce a quick movement of the gate valves 118, 120 from the gas flow path if desired. One such operating condition is that which occurs when the power request pedal 76 is quickly rotated clockwise as shown in FIG. 1 to impose a large power demand signal through the input line 100 to the controller 80. At this point a large error signal is produced in the governing action of the controller 80 wherein the demand signal through the line 100 is compared with the actual speed $N_1$ of the spool 12 directed to the controller 80 through the line 86. The error signal will produce an output signal on the line 102 for an increase in fuel to the combustor 22. This produces an immediate increase in the mass flow through the nozzle 36 to the gasifier turbine 38 to produce a speed increase in $N_1$ and correction of the previously mentioned error signal. During this phase of operation the improved controllers 108, 110 are readily responsive to the increased mass flow through the gas flow path 42 of the engine to the nozzle 48 as follows.

As the error signal is produced, an output signal is produced from an output line 314 to the solenoid 280 of dump mechanism 254 of operators 108, 110 to cause flapper 266 therein to be shifted from a normally closed position where it is magnetized into sealed engagement with O-ring valve seat 270 to an open position (non-magnetized) to cause air dump to atmosphere through tube 274 to atmosphere. Accordingly, fluid will rapidly exhaust from each of the chambers 246. The volume of mechanism 254 is preselected to be small relative to that of chamber 246 so that there is an immediate dump to atmosphere from tube 274 and an immediate reduction of the pressure within the power chamber 246 to near atmosphere and the coil spring 234 snaps the reciprocal shafts 208 to the left as shown in FIG. 3 thereby to produce an immediate movement of the gate valves 118, 120 into their storage position within the space 122.

The advantage of such a quick response mode of operation is especially desirable in gas turbine engines of the aforesaid type. It has been observed that when the power request pedal 76 is rapidly moved to a full acceleration position to produce a maximum error signal that the increased fuel flow and increase in combustion products enables the gasifier to reach a maximum speed operation within one second. As soon as the gasifier directs such increased volumes of gas through the engine it is necessary to have a full open flow area through the power turbine nozzle 48 to prevent compressor surge. However, because of the quick response mode of operation of the pneumatic operators 108, 110, the nozzle 48 will have its full open area ready to receive the increased mass of fluid flow from the gasifier when it accelerates in response to large error signals produced upon a rapid movement of the power request pedal 76.

The improved quick response pneumatic operators 108, 110 of the present invention are especially suitable for use with automotive type gas turbine engines in that they require only one fluid connection to each operator and an associated three-way valve to selectively communicate a control chamber of each of the operators to a regulated source of pressure to produce a slow rate controlled movement of gate valves under steady state conditions once the engine has reached a speed range of from 50% to 60% of its full design speed. The 50%-60% speed range produces a power output from the engine suitable for meeting most of the normal road load requirements for a gas turbine powered road vehicle. The pneumatic operators are further characterized by means internally thereof that permit a modulated slow rate control of the position of the gate valves to prevent excessive increases in turbine engine heat exchanger or regenerator temperatures following increases on engine turbine inlet temperatures that are produced by slow movement of the gate valves into a blocking position to reduce the gas flow area through the power turbine nozzle of the engine. And furthermore, the improved quick pneumatic response of the operators of the present invention are configured to be quickly responsive to a condition of operation that imposes a large error signal because of a power demand that is placed into the control to get more power from the engine if conditions require such additional power. In this case, the pneumatic operators quickly respond by means of internal components therein that cause the operator to be quickly dumped so that the gate valves connected thereto will quickly retract so that a full open flow path will be created within the engine in a time period that will prevent compressor surge as the gasifier spool is quickly accelerated in response to the error signal.

While the embodiments of the present invention, as herein disclosed, constitute a preferred form, it is to be understood that other forms might be adopted.

The embodiments of the invention in which an exclusive property or privilege is claimed are defined as follows:

1. A gas turbine engine gate valve control system for regulating gas flow through the turbine nozzle downstream of a source of motive fluid including air flow from a compressor in response to engine speed and temperature comprising: a pneumatic operator having a pressure chamber and a diaphragm with one side forming one wall of said pressure chamber and being movable in response to changes in pressure therein, said diaphragm having the opposite side thereof exposed to atmosphere and including a gate valve operator shaft connected thereto extending from said opposite side exteriorly of the pneumatic operator for reciprocating a turbine nozzle gate into and out of overlying relationship with the inlet to the turbine nozzle, spring means for biasing said diaphragm in opposition to fluid pressure in said chamber, a regulated source of pressure, means including flow restriction orifice means for maintaining said regulated source of pressure at a controlled rate to and from said pressure chamber during first and second modes of gas turbine engine operation to cause controlled slow velocity strokes of said operator shaft that move the valve gate between an open position out of overlying relationship with the turbine nozzle and a closed relationship therewith to slowly vary gas flow therethrough so as to progressively adjust engine power at a rate determined by flow across said orifice means, and dump means in communication with said pressure chamber operative when a predetermined engine speed error signal occurs upon engine acceleration to produce a quick dump of pressure from said pressure chamber and an immediate retraction of said gate by said spring means from its overlying relationship with the turbine nozzle into its open position thereby to avoid interference of said gate with increased gas flow to the inlet of said turbine nozzle, thereby to avoid compressor surge during gas turbine demand acceleration mode of operation.

2. A gas turbine engine gate valve control system for positioning a partial admission gate into and out of an inlet flow path to a turbine nozzle downstream of a source of motive fluid including air flow from a compressor comprising: a pneumatic operator having an end wall and a movable power diaphragm forming a pressurizable power chamber, a mounting base for the operator including an opening therein, an operator shaft connected at one end thereof to said power diaphragm and extending through said opening for reciprocal movement in response to movement of said diaphragm, said end wall on said pneumatic operator having an inlet and a dump opening therein, solenoid valve means including a flapper located in overlying relationship to said dump opening to close flow therethrough, means for directing a regulated source of pressure through said inlet to said pressurizable power chamber during a first mode of gas turbine engine operation and to cause a controlled build-up of pressure within said pressurizable power chamber and a slow rate extension of said operator shaft to gradually shift a partial admission gate into the flow path to the power turbine nozzle, means for terminating pressurization of said control diaphragm by said regulated source of pressure during an engine acceleration demand phase of operation, and means to open said flapper and said dump opening to dump pressurized fluid from said pressurizable power chamber, and spring means operative upon dump of said power chamber to cause a quick return movement of said shaft and the gate valve from a partial admission position to a fully open position thereby to prevent compressor surge.

3. A gas turbine engine gate valve control system for positioning a partial admission gate into and out of an inlet flow path to a turbine nozzle downstream of a source of motive fluid including air flow from a compressor comprising: a pneumatic operator having an end wall and a movable power diaphragm forming a pressurizable power chamber, a mounting base for the operator including an opening therein, an operator shaft connected at one end thereof to said power diaphragm and extending through said opening for a reciprocal movement in response to movement of said diaphragm, said end wall on said pneumatic operator having an inlet therein and dump valve means selectively opening and closing said dump opening, means including a flow control orifice for directing a regulated source of pressure into said pressurizable power chamber during a first mode of gas turbine engine operation while said dump valve means closes said dump opening thereby to cause a controlled buildup of pressure within said pressurizable power chamber and a slow rate extension of said operator shaft to gradually shift a partial admission gate into the flow path to said power turbine nozzle, heat exchanger means for heating inlet air to the compressor, flow control means including a flow restriction to communicate said pressurizable power chamber with atmosphere and operative to bleed pressure from said power chamber at a rate determined by said flow restriction to produce a controlled rate of movement of said gate valve out of said flow path in response to the temperature of said regenerator means.

4. A gas turbine engine gate valve control system for positioning a partial admission gate into and out of an inlet flow path to a turbine nozzle downstream of a source of motive fluid including air flow from a compressor comprising: a pneumatic operator including an end wall and a movable power diaphragm forming a pressurizable power chamber, a mounting base for the operator including an opening therein, an operator shaft connected at one end thereof to said power diaphragm and extending through said opening for reciprocal movement in response to movement of said diaphragm, said end wall on said pneumatic operator having an inlet and a dump opening therein, means including a control solenoid valve defining a control chamber on said operator in communication with said dump opening, said control chamber having a smaller volume than said power diaphragm, a solenoid controlled valve element located in overlying relationship to said dump opening and operative to open and close said dump opening, means for directing a regulated source of pressure to said inlet and to condition said valve element to close the dump opening during a first mode of gas turbine engine operation and to cause a controlled buildup of pressure within said pressurizable power chamber and a slow rate extension of said operator shaft to gradually shift a partial admission gate into the flow path to said power turbine nozzle, and means for terminating pressurization of said power chamber by said regulated source of pressure and simultaneously conditioning said valve element to dump pressurized fluid from said pressurizable power chamber and operative to cause a quick return movement of said shaft and the gate valve from a partial admission position to a fully open position thereby to prevent compressor surge.

5. A gas turbine engine gate valve control system for positioning a partial admission gate into and out of an inlet flow path to a turbine nozzle downstream of a source of motive fluid including air flow from a compressor comprising: a pneumatic operator including an end wall and a movable power diaphragm forming a pressurizable power chamber, a mounting base for the operator including an opening therein, an operator shaft connected at one end thereof to said power diaphragm and extending through said opening for reciprocal movement in response to movement of said diaphragm, said end wall on said pneumatic operator having an inlet and a dump opening therein, means including a control solenoid valve defining a control chamber on said operator in communication with said dump opening, said control chamber having a smaller volume than said power diaphragm, a solenoid controlled valve element located in overlying relationship to said dump opening and operative to open and close said dump opening, means for directing a regulated source of pressure to said inlet and to condition said valve element to close the dump opening during a first mode of gas turbine engine operation and to cause a controlled buildup of pressure within said pressurizable power chamber and a slow rate extension of said operator shaft to gradually shift a partial admission gate into the flow path to said power turbine nozzle, and means for terminating pressurization of said power chamber by said regulated source of pressure and simultaneously conditioning said valve element to dump pressurized fluid from said pressurizable power chamber and operative to cause a quick return movement of said shaft and the gate valve from a partial admission position to a fully open position thereby to prevent compressor surge, heat exchanger means for heating inlet air to the compressor, flow control means including a flow restriction to communicate said control chamber with atmosphere and operative to bleed pressure from said power chamber at a rate determined by said flow restriction to produce a controlled rate of movement of said gate valve out of said flow path in response to the temperature of said heat exchanger means.

* * * * *